United States Patent [19]
Dumas

[11] 3,848,158
[45] Nov. 12, 1974

[54] STATIC RELAYS SYNCHRONIZED ON THE PASSAGE TO ZERO

[75] Inventor: Guy H. Dumas, Paris, France

[73] Assignee: Silec-Semi-Conducteurs, Paris, France

[22] Filed: June 7, 1973

[21] Appl. No.: 367,938

[30] Foreign Application Priority Data
Nov. 29, 1972  France .............................. 72.42444

[52] U.S. Cl. ......... 317/11 A, 307/133, 307/252 UA, 317/33 SC
[51] Int. Cl. ............................................. H02h 7/22
[58] Field of Search....... 317/11 A, 33 SC; 307/136, 307/133, 252 UA

[56] References Cited
UNITED STATES PATENTS

| | | | |
|---|---|---|---|
| 3,328,606 | 6/1967 | Pinckaers...................... | 307/252 UA |
| 3,702,941 | 11/1972 | Aiduck et al..................... | 317/11 A |
| 3,723,769 | 3/1973 | Collins.......................... | 307/252 UA |

Primary Examiner—James D. Trammell
Attorney, Agent, or Firm—Sughrue, Rothwell, Mion, Zinn & Macpeak

[57] ABSTRACT

A static relay designed to constitute an interrupter control device operating in synchronism with the passage to zero of the current in a load circuit supplied with alternating or rectified alternating power.

In this relay, the interrupter 1 consists of semi-conductor elements and is provided with two main electrodes $a$ and $b$ inserted between the alternating load and supply circuit, and a control electrode $g$. The interrupter is arranged in such a manner that it is in the open or non-conductive state when no current is applied to the control electrode $g$ for a longer period of time than a half cycle of the supply voltage, and that it is locked in the closed or conductive state as soon as a suitable current is applied to the electrode $g$, and that it remains conductive until the end of the half cycle even if the control current has disappeared with the end of the half cycle of the current between the electrodes $a$ and $b$.

10 Claims, 14 Drawing Figures

STATIC RELAYS SYNCHRONIZED ON THE PASSAGE TO ZERO

BACKGROUND OF THE INVENTION

The present invention relates to a static relay synchronized on the passage to zero, and more particularly, to an interrupter control device in synchronism with the passage to zero of the current in a load circuit supplied with current in an alternating manner, or by a rectified alternating wave; the interrupter consisting of semi-conductor elements and being provided with two main electrodes inserted between the supply and the load circuit, and with a control electrode.

SUMMARY OF THE INVENTION

More particularly, the object of the present invention is to provide control means for an interrupter designed in such a manner that it is in the open state (non-conductive) when no current is applied to the control electrode for longer than one half cycle of the supply voltage, and that it is locked in the closed state (conductive) as soon as a suitable current is applied to the central electrode, and that it remains conductive until the end of the half cycle, even if the control current has disappeared before the end of this half cycle of the current between the two main electrodes.

Another object of the present invention is to synchronize the locking of this interrupter in such a way that its closure takes place at the time when the instantaneous power is very low, so as to avoid the risk of excess voltages harmful to the load circuit and of disturbances to the adjacent circuits or to the circuits supplied by the same source. For this reason, the control circuit according to the invention is designed in such a manner that, irrespective of the resistive or inductive nature of the charge, it effects the locking of the interrupter approximately at the time of the first passage to zero of the supply voltage following the order to close the circuit; the automatic opening of the circuit approximately at the time of the passage through zero of the current and the automatic relocking of the circuit immediately after this instant for as long as the closing order is maintained; the automatic opening of the circuit approximately at the time of the first passage through zero of the current following the disappearance of the closing order. This open position is then maintained permanently until the time of the first passage through zero of the supply voltage following the possible re-application of the order to close.

More specifically, another object of the present invention is to provide a static relay incorporating both the interrupter defined above and the control device, and designed in such a way that the connections between the supply and load circuits on the one hand, and the static relay on the other hand, are limited to only two wires, and that means are provided to galvanically insulate the interruption circuits with respect to the circuits providing the order to close.

The static relay according to the invention incorporating an interrupter and a control device of the same in synchronism with the passage to zero of the current in a load circuit supplied with power in an alternating manner or by a rectified alternating wave is novel in that its interrupter consists of semi-conductor elements and is provided with two main electrodes inserted between the power supply and the load circuit and a control electrode, and in that it comprises as the interrupter control device, an auxiliary control interrupter interposed in series between one of the main electrodes and the control electrode of the latter. This auxiliary control interrupter consists essentially of an auxiliary semi-conductor device which, by reason of its construction and without the addition of a phase inverter, remains in the open or non-conductive state as long as the voltage between the main electrode selected, and the control electrode, is greater than a threshold value, or as long as no order to close is present. This auxiliary semi-conductor device changes from the closed or conductive state each time the above-mentioned voltage passes through lower values than the threshold value if a voltage representing the order to close is applied to it. The threshold value is a function of the value of the voltage representing the order to close and varying in the same way as it.

More specifically, the auxiliary control interrupter according to the invention consists of a cascade assembly of four semi-conductive layers with alternating dopings such that the electrical path between the outer electrodes always encounters at least one blocking junction. This auxiliary control interrupter may be a "thyristor" type semi-conductor comprising two outer electrodes consisting of an anode and a cathode respectively, and at least one intermediate electrode operating as a triggering electrode.

Accordingly, the control device of the main interrupter or the auxiliary interrupter may consist either of a thyristor comprising an anode, a cathode and a cathode triggering electrode connected in such a manner that the control current of the main interrupter has to close the circuit between the anode and the cathode triggering electrode and that the voltage representing the order to close is applied between the anode and the cathode - or of a thyristor comprising an anode, a cathode and an anode triggering electrode connected in such a manner that the control current of the main interrupter has to close the circuit from the anode triggering electrode to the cathode, and that the order to close is applied between the anode and the cathode.

The interrupter control device according to the invention may be a semi-conductor device designed or connected in such a way that it has at least three junctions in cascade formation between its outer electrodes. At least one of these junctions blocks the passage of the current in the absence of an order to close the circuit. The voltage representing this order to close is applied between the ends of the device. An outer electrode and an intermediate electrode are connected to the interrupter in such a manner that the control current of the latter can only close a circuit between these two electrodes and that this can only take place when the voltage at the terminals of the interrupter is lower than a threshold value directly dependent on the voltage representing the order to close.

The interrupter may also be bidirectional; a rectifying bridge being placed between one of its main terminals and its control terminal; the voltage outputs coming from this bridge being connected, on the one hand, to an outer electrode and an intermediate electrode or triggering electrode of a control thyristor, the outer electrodes of which receive the order to close, and, on the other hand, to two impedances, the common point of which is connected to the other main terminal of the interrupter.

According to the present invention, the arrangement of the interrupter and the control device of the same is such that the order to close may be an alternating, sinusoidal or impulsive voltage applied by means of a transformer between the anode and cathode of the control thyristor, and that the period of time during which the locking of the interrupter is permitted, is determined by the amplitude of the positive vertices of the voltage applied. This order to close may also be a continuous voltage which may be issued by a battery of photocells and the period of time during which the locking of the interrupter is authorized is determined by the light intensity received by the photocells.

Other objects, features and advantages of the present invention will be made apparent from the following detailed description thereof provided with reference to the accompanying drawings in which:

DESCRIPTION OF THE PREFERRED EMBODIMENTS

Figure 1A:
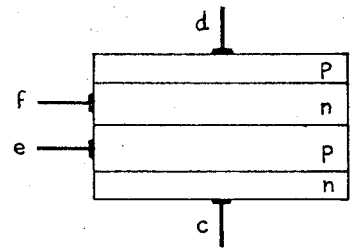
FIGS. 1A and 1B represent diagrammatic examples of the disposition of the four layers constituting the auxiliary control interrupter in the form of a thyristor.
Figure 1B:
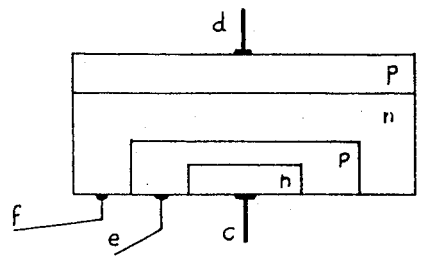
Figure 1C:
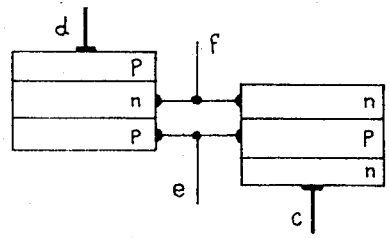
FIG. 1C represents another diagrammatic example of the auxiliary control interrupter consisting of two complementary transistors connected to each other.
Figure 1D:
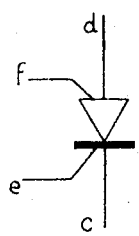
FIG. 1D shows the auxiliary interrupter used in the following figures and represented as a general symbol.
Figure 2A:
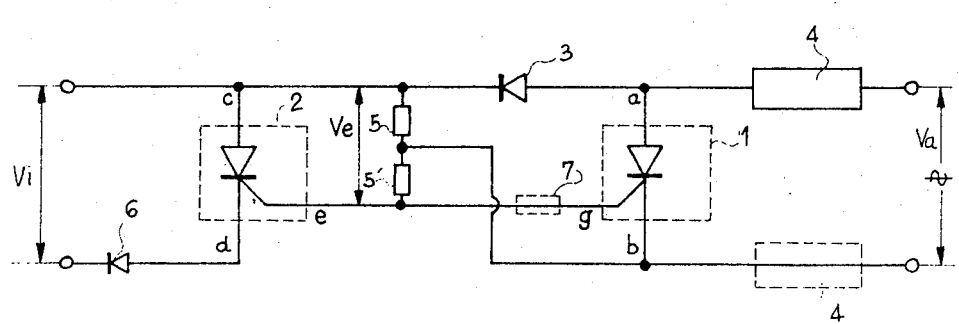
FIGS. 2A and 2B represent an embodiment of the present invention in which the control device is a thyristor comprising a cathode triggering electrode.
Figure 2B:
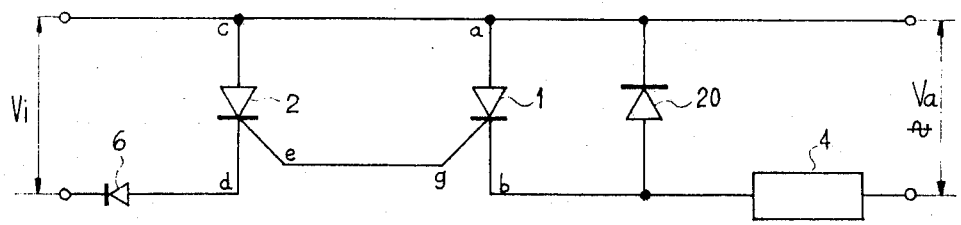
Figure 3:
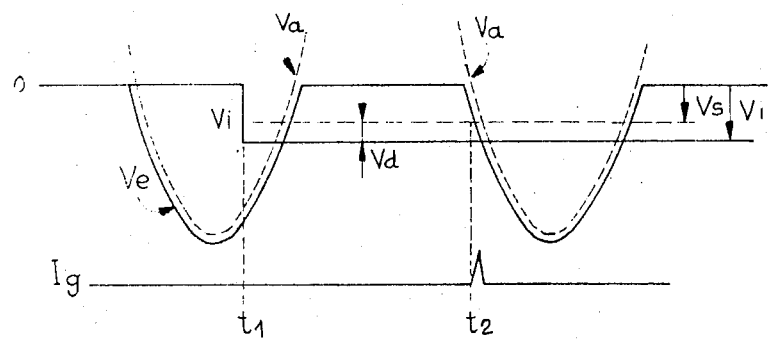
FIG. 3 is a diagram indicating the method of operation of the embodiment according to FIG. 2.
Figure 4:
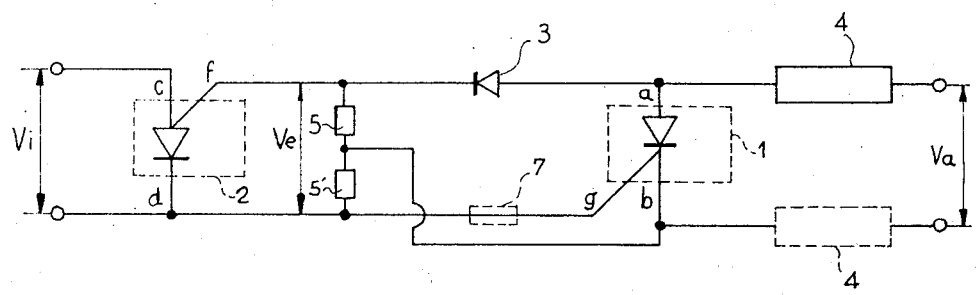
FIGS. 4A and 4B represent another embodiment of the present invention in which the control device 2 is a thyristor comprising an anode triggering electrode.
Figure 4:
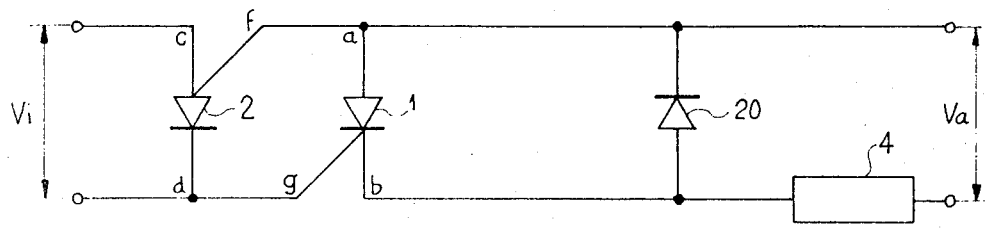

As will be appreciated, FIGS. 2, 3, and 4 relate to embodiments of the present invention in which the main interrupter 1 is a unidirectional conduction device, more particularly a "thyristor" comprising an anode $a$, a cathode $b$ and a control electrode $g$. It is inserted by its electrodes a and b between one of the supply and load wires 4. This wire 4 may either be placed in series with electrode $a$, or with electrode $b$. The power supply may be purely alternating or it may be produced by rectifying an alternating voltage. The unidirectional interrupter 1 may be one of the components of a bidirectional interrupter, consisting, for example, of two thyristors mounted in an anti-parallel manner, or of a thyristor and an anti-parallel diode.

In the embodiment shown in FIG. 2A, the control device 2 is a thyristor, the outer electrodes of which, c and d, (anode and cathode) receive the voltage $V_i$ representing the order to close while the anode c is connected to the electrode a and the cathode triggering electrode e is connected to the thyristor control electrode g representing the main interrupter 1. If the non-rectified alternating current is used for the power supply, a diode 3 is added between $a$ and $c$ or between $e$ and $g$ to block the negative half cycle. Two resistances 5 and 5' are connected in series between $c$ and $e$ to provide a path for the current coming from the control voltage $V_i$ when the junction $e\,d$ between the triggering electrode and cathode is polarized in the appropriate direction. The joining point of the two resistances 5 and 5' is connected to the electrode $b$ of the main interrupter 1 to avoid a current from confining itself to the control electrode g of the interrupter 1 when the control device 2 is in the blocked state. The elements 3, 5 and 5' are no longer necessary if a diode 20 is placed in an anti-parallel manner to the terminals of the thyristor 1, as represented in FIG. 2B.

A diode 6 may possibly be inserted in series with the voltage $V_i$ to increase the possibilities of blocking the junction $e\,d$ when it is polarized in reverse, and a small resistance 7 may be inserted either between $a$ and $c$ or between $e$ and $g$ to limit the control current and to attenuate any possible resonances.

The modus operandi of this embodiment is represented in diagrammatic form in FIG. 3. The control current Ig of the interrupter 1 is shown in correspondance with the voltages ascribed to the potential of the anode c of control thyristor 2. $V_a$ represents the alternating supply voltage. $V_e$ represents the voltage between e and c, $V_i$ the voltage representing the order to close and $V_s$ the threshold voltage defining the possible conduction of the control thyristor 2. The modus operandi is based on the principle that a current can only circulate between c and e (conduction of the device 2) if the electrode $d$ is more negative by at least $V_d$ with respect to the electrode $g$ (triggering electrode), i.e., when the voltage $V_e$ between e and c is lower in absolute value by at least $V_d$ with respect to the voltage $V_i$ representing the order to close. The condition of the passage of a current in the control electrode of the main interrupter is thus:

$$O < V_e < V_s \text{ with } V_s = V_i - V_d$$

where $V_e$, $V_i$ and $V_s$ are the absolute values of the instantaneous voltages.

This condition can only be obtained in the region of the passage to zero of the voltage between $a$ and $b$. Thus, if the order to close is applied at an instant $t_1$ during one half cycle, the control current of the interrupter 1 is only established at the beginning of following half cycle (the instant $t_2$ in FIG. 3).

In the embodiment illustrated in FIG. 4A, a thyristor comprising an anode triggering electrode f is used as the control device 2. The voltage $V_i$ representing the order to close is always applied between the outer electrodes c and d, but the circuit of the control electrode of the main thyristor 1 is in this case, established between the anode triggering electrode f and the cathode d of the control thyristor. The modus operandi is identical to that described in the previous case — in this instance, taking as a reference for the voltages, the cathode d of the control thyristor. As in the case of the embodiment according to FIG. 2B, if a diode 20 is disposed anti-parallel to the terminals of the thyristor 1, the elements 3, 5 and 5' become unnecessary, as shown in FIG. 4B.

Figure 5:
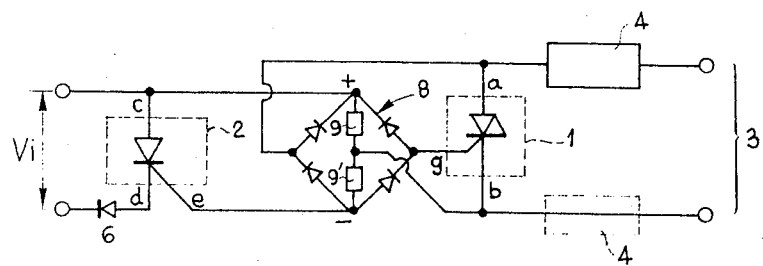
FIGS. 5 and 6 are two other embodiments of the present invention featuring a bidirectional interrupter.
Figure 6:
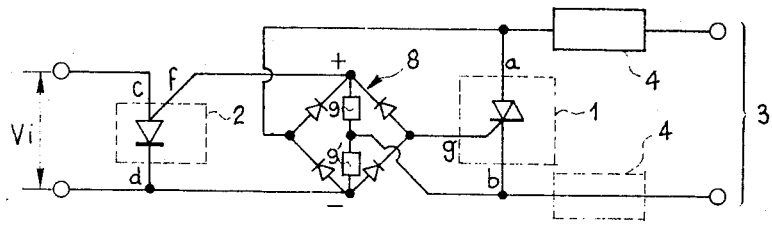

FIGS. 5 and 6 relate to two embodiments of the present invention featuring the use of a "triac" bidirectional interrupter 1 or of an interrupter constituted by the anti-parallel assembly of two thyristors comprising two main terminals a and b and a control terminal g.

According to the embodiment represented in FIG. 5, a diagonal of a rectifier bridge 8 is placed between the main terminal a of the interrupter 1 and its control terminal g. The control device 2 is inserted into the other diagonal of the bridge in such a manner that its anode c is connected to the + output of the rectifier bridge 8 and its triggering electrode e is connected to the − output of this bridge. The voltage $V_i$ representing the order to close is always applied between the outer electrodes c and d of device 2. In addition, two resistances 9 and 9' are connected, on the one hand, to the + and − outputs, respectively, of the bridge 8 and, on the other hand, to the terminal b of the main interrupter 1. These resistances provide a path for the current crossing the junction ed of the control thyristor 2 when a signal $V_i$ is applied between c and d and the voltage between the + and − outputs of the bridge is lower than the threshold value $V_2 = V_i - V_d$. However, the resistances 9 and 9' do not provide a current path between the terminal a and the control terminal g of the main interrupter.

The method of operation is identical to that described for FIG. 2A, but in FIG. 3 the voltage $V_a$ is replaced by the double alternation rectified voltage present between the + and − terminals of the rectifier bridge.

In the embodiment represented in FIG. 6, a diagonal of the rectifier bridge 8 is placed between a and g as before, but the control device 2 comprises an anode triggering electrode f which is connected to the + output of the rectifier bridge, while its cathode d is connected to the − output of this bridge. The voltage $V_i$ representing the order to close is always applied between c and d, and the resistances 9 and 9' are connected as previously described. The modus operandi is identical to that of FIG. 4, but taking place with each alternation of the supply voltage.

Figure 7:
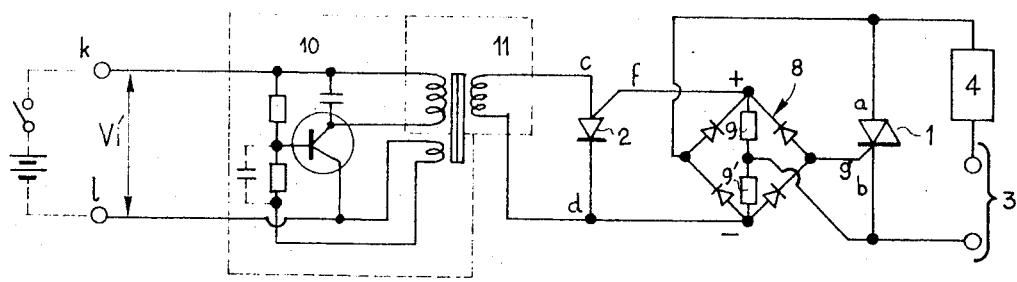
FIG. 7 represents a preferred application of the present invention to a synchronized static relay.

FIG. 7 represents a preferred application of the invention to a synchronized static relay galvanically insulating the supply and load circuits with respect to the circuits providing the order to close. According to this application, a bidirectional interrupter 1 is inserted between the alternating supply 3 and the load circuit 4. A rectifier bridge 8 is connected between the terminals a and g of the interrupter 1. Two resistances 9 and 9', the common point of which is connected to the terminal b of the interrupter 1, are disposed between the + and − outputs of the bridge. A triggering electrode and an outer electrode of the control thyristor 2 are also connected to the same + and − outputs in accordance with the embodiments described in FIGS. 5 or 6 of the present invention.

The voltage $V_i$ providing the order to close and being applied between the outer electrodes of the device 2 is an alternating, sinusoidal or impulsive wave coming from an oscillator 10 by way of a transformer 11. For the circuit to function correctly, this wave must have a much higher frequency than that of the alternating supply voltage. The oscillator 10 may be a sinusoidal or relaxation oscillator. The opening or closing order of the main interrupter is provided by allowing or preventing the operation of the oscillator by any known means, for example, by applying or removing a supply voltage $V_i$ between the input terminals kl.

Figure 8:
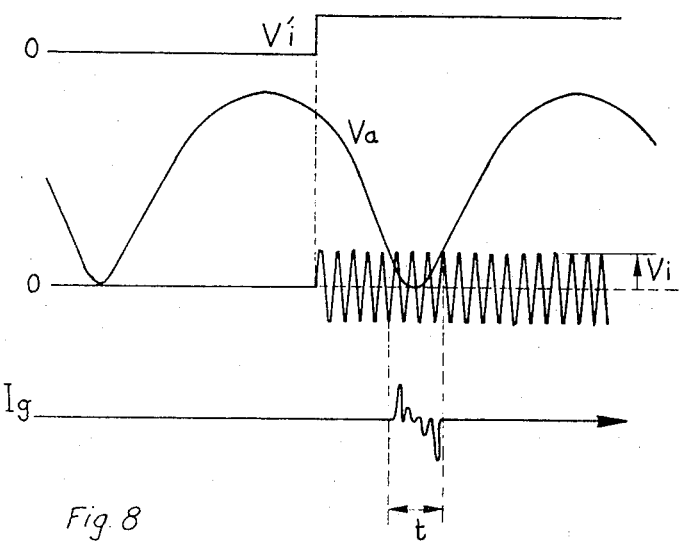
FIG. 8 is a diagram of the modus operandi of the synchronized static relay shown in FIG. 7.

FIG. 8 represents the method of operation of this relay in diagrammatic form. $V_a$ is the voltage between the + and − terminals of the rectifier bridge and $V_i$ is the alternating voltage representing the order to close.

The device 2 establishes a short circuit between the + and − terminals of the rectifier bridge 8 and thus allows a current to pass between a and g each time a positive alternation of the voltage $V_i$ occurs during the period of time t where $V_a$ would be lower than $V_s$ ($V_s$ being equal to the top value of V less the voltage reduction in the junction cf of the device 2). The threshold values $V_s$ and thus the duration of the period of time t where the locking of the interrupter 1 is permitted, is adjusted by the amplitude of the wave of the voltage $V_i$ representing the order to close.

Figure 9:
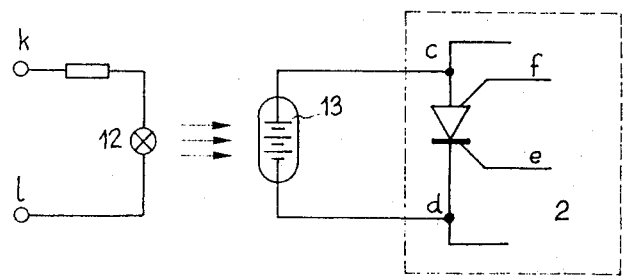
FIG. 9 represents another way of applying the present invention to a static relay in which the isolation of the circuits providing the order to close is ensured by opto-electronic coupling.

As represented in FIG. 9, the present invention may also be used to constitute a static relay in which the insulation of the circuits providing the order to close is ensured by optoelectronic coupling. To provide this, the unit in FIG. 7 consisting of transformer 11 and oscillator 10 may be replaced by a light source (bulb or photo-emissive cell), the illumination of which constitutes the order to close with respect to a battery of photocells, the positive electrode of which is connected to the anode c and the negative electrode of which is connected to the cathode d of the control thyristor 2. The diagram of FIG. 9 ends at the control thyristor 2, from which a unidirectional interrupter, a unit of these interrupters or a bidirectional interrupter according to any one of the arrangements illustrated in FIGS. 2, 4, 5 and 6, may be controlled.

As soon as a current having a suitable value is applied to terminals kl of the photo-emissive cell 12, a continuous voltage $V_i$ appears at the terminals of the battery of photocells 13, i.e., between the cathode and anode of the device 2. This latter becomes conductive and releases the interrupter each time the voltage between the anode c and the triggering electrode e or between the anode triggering electrode f and the cathode d reaches a positive value greater than the threshold value $V_s$ determined by the value of the voltage $V_i$. The period of time t during which the locking of the main interrupter is permitted, is thus determined by the voltage of the photocell and ultimately by the value of the current applied to the photo-emissive cell.

The present invention is not restricted to the embodiments which have been described and various modifications may be made without departing from the scope of the invention.

What is claimed is:

1. A solid-state, static relay circuit comprising:
a pair of power terminals adapted to be connected in series with a load and a source of alternating or rectified alternating supply voltage,
first controllably conductive semiconductor means having a pair of main electrodes and a control electrode, said pair of main electrodes being connected to said pair of power terminals,
second controllably conductive semiconductor means having a pair of main electrodes and a control electrode, said control electrode and one of said main electrodes of said second controllably conductive semiconductor means being connected to said control electrode and one of said main electrodes of said first controllably conductive semiconductor means, and a pair of control terminals adapted to be connected to a control signal source and being connected to said pair of main electrodes of said second controllably conductive semiconductor means, whereby said static relay circuit can be triggered only when a control signal is provided at said pair of control terminals and said supply voltage passes through approximately zero or is lower than a threshold value which is related to the amplitude of said control signal.

2. A static relay circuit according to claim 1 wherein said second controllably conductive semiconductor means consists of a "thyristor" type semiconductor device and its said pair of main electrodes are an anode and a cathode, respectively, and said control electrode is a cathode or anode triggering electrode.

3. A static relay circuit according to claim 2 wherein said control electrode is a cathode triggering electrode and said anode is connected to the one of said pair of main electrodes of said first controllably conductive semiconductor means which is at the highest potential when said first controllably conductive semiconductor means is in a non-conductive state and said cathode triggering electrode is connected to said control electrode of said first controllably conductive semiconductor means.

4. A static relay circuit according to claim 2 wherein said control electrode is an anode triggering electrode and is connected to the one of said pair of main electrodes of said first controllably conductive semiconductor means which is at the highest potential when said first controlably conductive semiconductor means is in a non-conductive state and said cathode is connected to said control electrode of said first controllably conductive semiconductor means.

5. A static relay circuit according to claim 2 further comprising a transformer having primary and secondary windings, said secondary winding being connected to said pair of control terminals and said primary winding being adapted to be connected to a source of alternating, sinusoidal or impulsive voltage, the period of time during which a control current flows in the control electrode of said first controllably conductive semiconductor being determined by the amplitude of the peak values of the voltage applied to said primary winding.

6. A static relay circuit according to claim 2 further comprising a battery of photocells connected to said pair of control terminals and adapted to be illuminated by a source of light, the period of time during which a control current flows in the control electrode of said first controllably conductive semiconductor being determined by the intensity of the light illuminating said battery of photocells.

7. A static relay circuit according to claim 2 further comprising a rectifier diode bridge interposed between said first and second controllably conductive semiconductor means, one diagonal of said bridge being connected between one of said pair of main electrodes and said control electrode of said first controllably conductive semiconductor means, the other diagonal of said bridge being connected between one of said pair of main electrodes and said control electrode of said second controllably conductive semiconductor means.

8. A static relay circuit according to claim 7 further comprising first and second series connected resistors connected across said other diagonal of said bridge, the junction of said first and second resistors being connected to the other of said pair of main electrodes of said first controllably conductive semiconductor means.

9. A static relay circuit according to claim 7 further comprising a transformer having primary and secondary windings, said secondary winding being connected to said pair of control terminals and said primary winding being adapted to be connected to a source of alternating sinusoidal or impulse voltage, the period of time during which a control current flows in the control electrode of said first controllably conductive semiconductor being determined by the amplitude of the peak values of the voltage applied to said primary winding.

10. A static relay circuit according to claim 7 further comprising a battery of photocells connected to said pair of control terminals and adapted to be illuminated by a source of light, the period of time during which a control current flows in the control electrode of said first controllably conductive semiconductor being determined by the intensity of the light illuminating said battery of photocells.

* * * * *